US007627419B2

(12) United States Patent
Yoshida (10) Patent No.: US 7,627,419 B2
(45) Date of Patent: Dec. 1, 2009

(54) IMAGE DISPLAY SYSTEM (75) Inventor: Ichiro Yoshida, Takahama (JP)

(73) Assignee: Denso Corporation, Kariya (JP)

( * ) Notice: Subject to any disclaimer, the term of this patent is extended or adjusted under 35 U.S.C. 154(b) by 394 days.

(21) Appl. No.: 11/510,943

(22) Filed: Aug. 28, 2006

(65) Prior Publication Data
US 2007/0067089 A1    Mar. 22, 2007

(30) Foreign Application Priority Data
Sep. 16, 2005   (JP)   ............... 2005-270229

(51) Int. Cl.
*B60T 7/12* (2006.01)
(52) U.S. Cl. ............... 701/117; 701/96; 359/13; 359/14; 340/905; 340/995.13; 345/7
(58) Field of Classification Search ............ 701/96, 701/117, 118, 119; 359/1, 12, 14, 630; 340/901, 340/905, 995.12, 995.15, 995.13; 345/5, 345/6, 7
See application file for complete search history.

(56) References Cited
U.S. PATENT DOCUMENTS
6,253,150 B1 * 6/2001 Nakamura .............. 701/208

6,456,438 B1 * 9/2002 Lee et al. .............. 359/630
6,708,087 B2 3/2004 Matsumoto
2002/0055808 A1 * 5/2002 Matsumoto ............ 701/1
2005/0071082 A1 * 3/2005 Ohmura et al. .......... 701/211

FOREIGN PATENT DOCUMENTS
JP   2004-069600   3/2004
JP   2005-107916   4/2005

* cited by examiner

*Primary Examiner*—Thomas G Black
*Assistant Examiner*—Peter D Nolan
(74) *Attorney, Agent, or Firm*—Harness, Dickey & Pierce, PLC (57) ABSTRACT An image display system for use of a driver in a subject vehicle includes a look area detector for detecting a look area of the driver who watches a real leading vehicle on a transparent glass in a front of the driver and a control unit for controlling display of a transparent image on the transparent glass in the front of the driver for representing a virtual leading vehicle. When the look area detected by the look area detector overlaps at least a portion of the transparent image of the virtual leading vehicle displayed on the transparent glass, the control unit increases a degree of transparency of at least an overlapping portion of the transparent image of the virtual leading vehicle relative to a non-overlapping portion of the transparent image of the virtual leading vehicle.

13 Claims, 6 Drawing Sheets

INCREASE TRANSPARENCY UPON DISPLAYING VIRTUAL LEADING VEHICLE IMAGE

FIG. 6B

HIGHLIGHT BRAKE LAMP OF VIRTUAL LEADING VEHICLE

IMAGE DISPLAY SYSTEM

CROSS REFERENCE TO RELATED APPLICATION

This application is based on and claims the benefit of priority of Japanese patent Application No. 2005-270229 filed on Sep. 16, 2005, the disclosure of which is incorporated herein by reference.

FIELD OF THE INVENTION

The present invention generally relates to an image display system for use in a vehicle.

BACKGROUND OF THE INVENTION

In recent years, a driving support system that displays an image of a virtual vehicle at a position between a tail of a traffic congestion and a subject vehicle that is approaching the tail of the congestion has been developed. The system displays the vehicle image on a transparent glass, i.e., on a windshield, for the driver of the subject vehicle. The system having this kind of driving support scheme is disclosed in, for example, Japanese patent documents JP-A-2002-144913 and JP-A-2005-127996.

However, an image position of the virtual vehicle projected on the windshield sometimes overlaps a look direction of the driver who watches a real leading vehicle at the tail of the congestion. In this case, the image of the virtual vehicle obstacles the driver's sight, and thus causes a trouble for recognizing the existence and the position of the real vehicle ahead of the subject vehicle.

Further, Japanese patent document JP-A-2005-127996 describes in the disclosure that the system changes the image position or an image type of the virtual vehicle depending on the existence of the real leading vehicle. However, turning on and off of the image of the virtual vehicle depending on the existence of the real leading vehicle may throw the driver of the subject vehicle into confusion contrary to an intended effect of the system.

SUMMARY OF THE INVENTION

In view of the above-described and other problems, the present disclosure provides an image display system that suitably displays an image of a virtual leading vehicle or the like which follows a real leading vehicle as an assistance for a driver of a subject vehicle without compromising a visibility of the real leading vehicle which the driver of the subject vehicle should pay attention to.

In an aspect of the present disclosure, the image display system for use of a driver in a subject vehicle includes a look area detector for detecting a look area of the driver who watches a real leading vehicle on a transparent glass in a front of the driver and a control unit for controlling display of a transparent image on the transparent glass in the front of the driver for representing a virtual leading vehicle. When the look area detected by the look area detector overlaps at least a portion of the transparent image of the virtual leading vehicle displayed on the transparent glass, the control unit increases a degree of transparency of at least an overlapping portion of the transparent image of the virtual leading vehicle relative to a non-overlapping portion of the transparent image of the virtual leading vehicle. In this manner, the image display system appropriately assist a driving operation of the driver without compromising visibility even when the image of the virtual leading vehicle overlaps the look area of the driver. That is, the driver can recognize the real leading vehicle without problem. In addition, a non-overlapping portion of the image is not changed for reducing an uncomfortable feeling caused by the change of the transparency.

The image display system further includes a position detector for detecting a current position of the subject vehicle and a hot spot storage unit for storing information on a hot spot which the driver of the subject vehicle pays attention to. The control unit controls display of the transparent image of the virtual leading vehicle when a distance between the current position of the subject vehicle detected by the position detector and a hot spot stored in the hot spot storage unit becomes smaller than a first preset value. In this manner, the virtual leading vehicle is displayed at an appropriate timing in terms of a distance from, for example, a traffic congestion.

In another aspect of the present disclosure, the image of the virtual leading vehicle is changed or highlighted when the distance from the subject vehicle to the real leading vehicle decreases from the first preset value. In addition, the size of the image of the virtual leading vehicle is changed according to the distance from the hot spot. Further, other attribute of the virtual leading vehicle such as a display color, a shape of the vehicle is changed according to a user input. In this manner, the driver is warned in an appropriate manner when the subject vehicle approaches the traffic congestion.

Furthermore, the image display system reduces speed of the subject vehicle when the vehicle approaches the hot spot without braking. In this manner, the driving operation of the subject vehicle is appropriately assisted.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Embodiments of the present disclosure are described with reference to the drawings. The embodiments of the present disclosure are not necessarily limited to the types/forms in the present embodiment, but may take any form of the art or technique that is regarded within the scope of the present disclosure by artisans who have ordinary skill in the art. Please note that, though the embodiment describes an application of the present disclosure for a left-hand side traffic, the disclosure may be applied to a right-hand side traffic if the right-left relationship is reversed.

Figure 1:
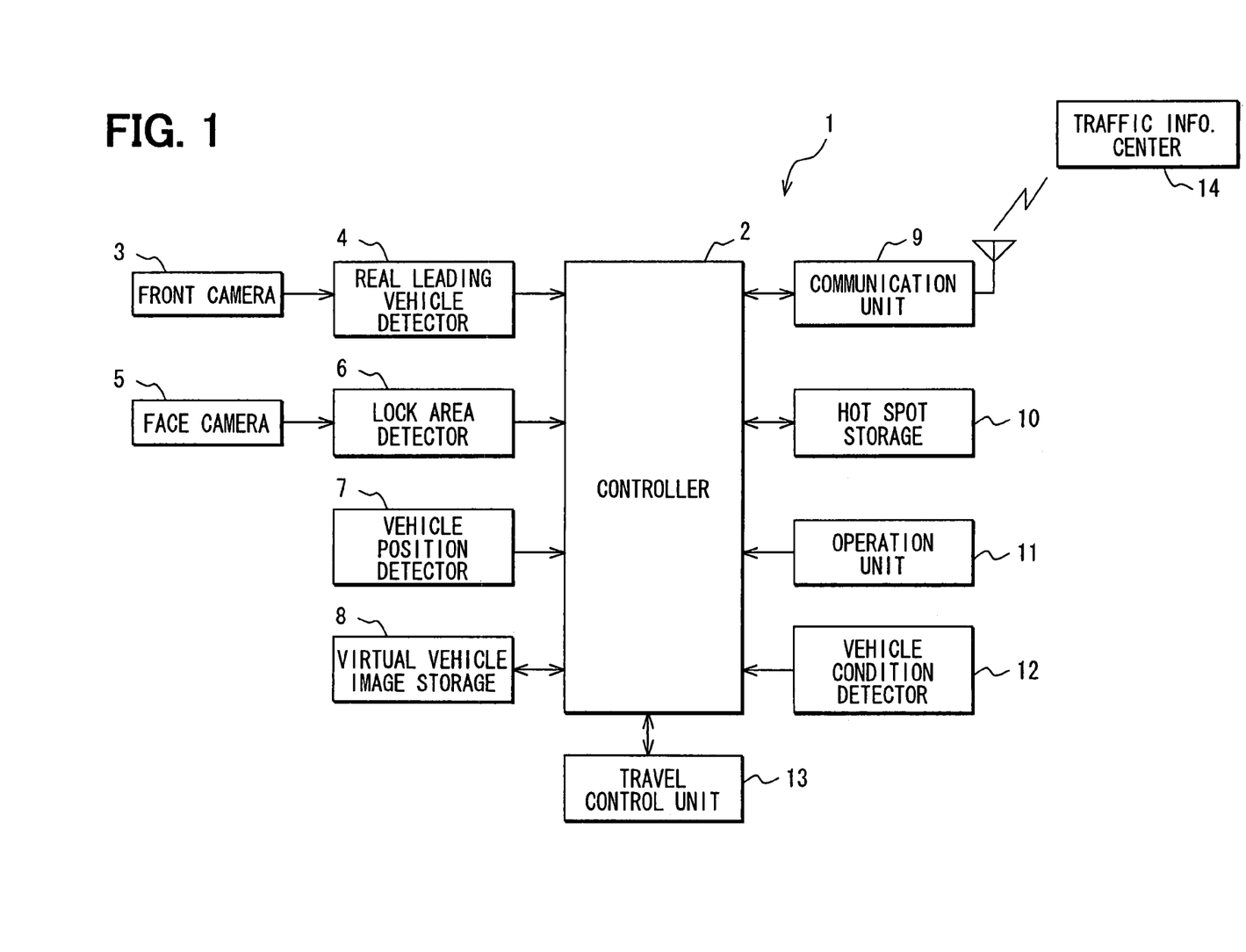
FIG. 1 shows a block diagram of an image display system in an embodiment of the present disclosure.

FIG. 1 shows a block diagram of an image display system 1 in an embodiment of the present disclosure. The image display system 1 includes a controller 2, a front camera 3, a real leading vehicle detector 4, a face camera 5, a look area detector 6, a current position detector 7, a virtual vehicle image storage 8, a communication unit 9, a hot spot storage 10, an operation unit 11, a vehicle condition detector 12, and a travel control unit 13.

The controller 2 provides various controls for controlling the image display system 1. The front camera 3 captures a forward image of the subject vehicle, and output the image to the real leading vehicle detector 4. The real leading vehicle detector 4 analyzes the image from the front camera 3 for detecting a real leading vehicle in front of the subject vehicle, and outputs an analysis result to the controller 2. The real leading vehicle detector 4 also outputs a distance from the subject vehicle to the real leading vehicle to the controller 2 based on the analysis result. The face camera 5 captures an eye image of a driver of the subject vehicle, and outputs the eye image to the look area detector 6. The look area detector 6 analyzes the eye image from the face camera 5 for detecting a look area of the driver, and outputs an analysis result to the controller 2.

The current position detector 7 includes, for example, a GPS receiver for detecting a current vehicle position of the subject vehicle, and outputs the position to the controller 2. The virtual vehicle image storage 8 stores a virtual leading vehicle image that virtually represents a leading vehicle. The controller 2 retrieves the virtual leading vehicle image from the virtual vehicle image storage 8, and displays the vehicle image on a transparent windshield in front of the driver.

The communication unit 9 communicates with a traffic information center 14 by using a mobile communication network such as a cellular phone. The hot spot storage 10 stores information on a hot spot where the driver should pay attention to an external driving environment such as frequent occurrence of traffic congestions, traffic accidents or the like. The hot spot may be specified by a user, or the driver, to be stored in the hot spot storage 10, or may be provided by the traffic information center 14 to be stored in the hot spot storage 10 through the communication unit 9. The operation unit 11 is used by the user, or the driver, for inputting a user operation, and outputs contents of the user operation to the controller 2.

The vehicle condition detector 12 detects, for example, a travel condition of the subject vehicle, and outputs a detection result to the controller 2. The travel control unit 13 provides a brake control, a steering control or the like according to a control instruction when the control instruction is inputted from the controller 2. The image display system 1 may partially be constructed by using a part of a navigation system or the like. For example, the current position detector 7 and/or the operation unit 11 may be shared with the navigation system or the like.

Figure 2:
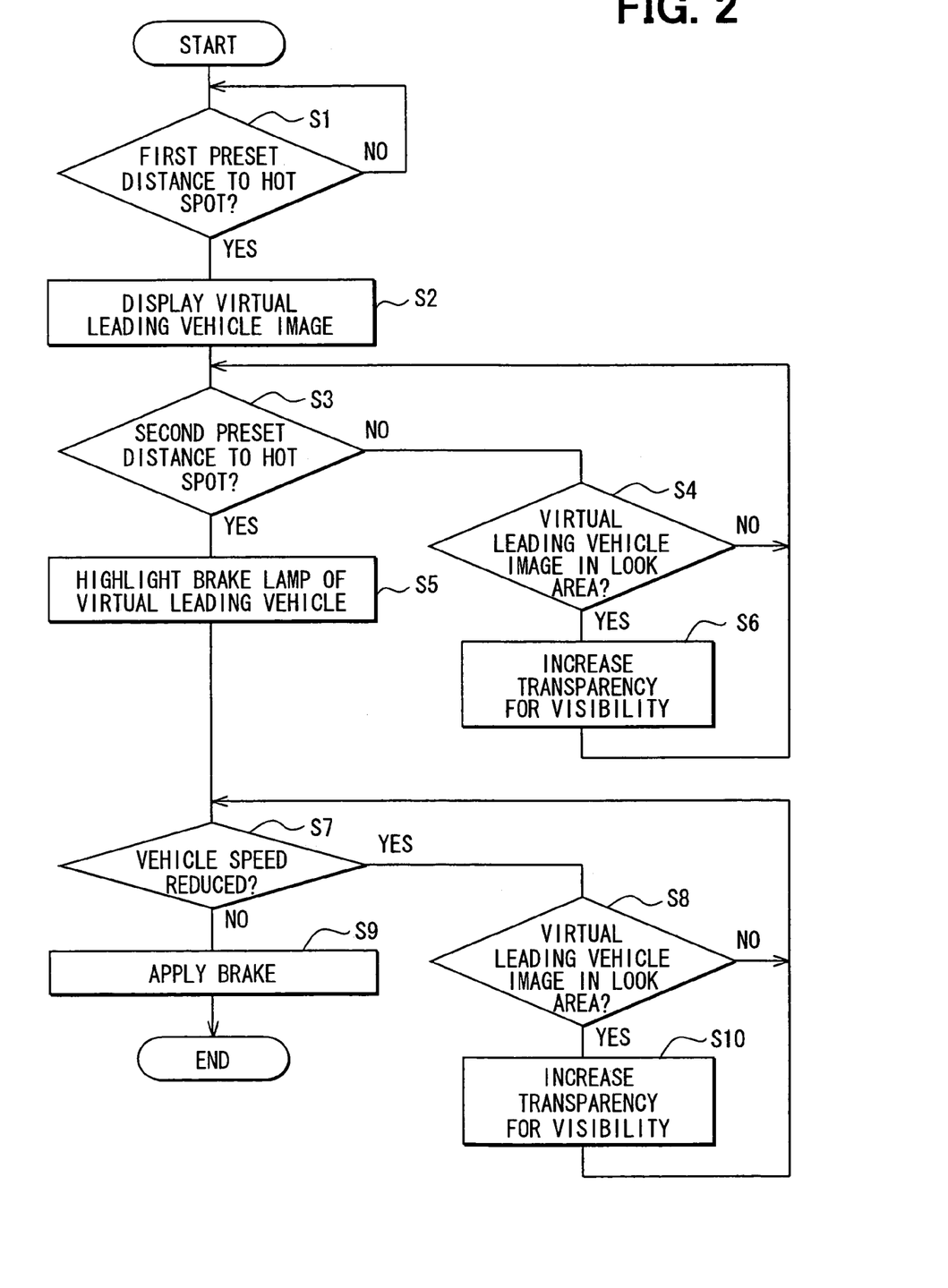
FIG. 2 shows a flowchart of a control process in the image display system.
Figure 6A:
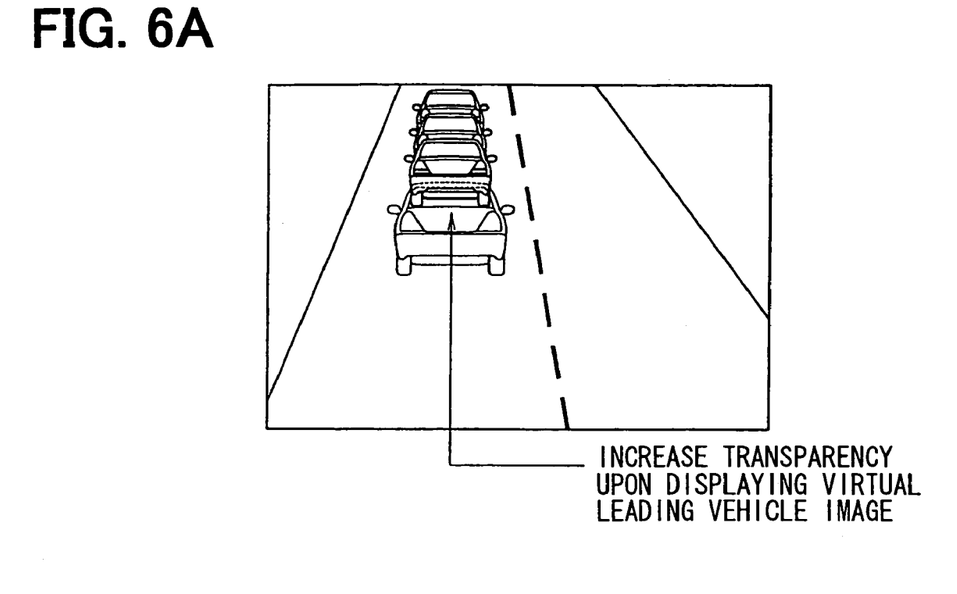
FIG. 6A and 6B show two other illustrations of the virtual leading vehicle in various representation forms.
Figure 6B:
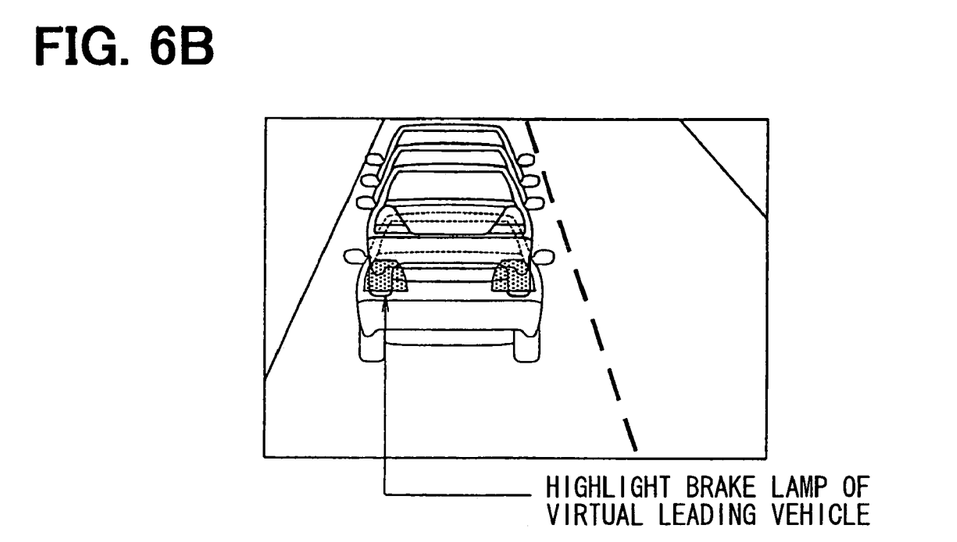

The operation of the image display system 1 is described with reference to FIGS. 2 and 6. FIG. 2 shows a flowchart of a control process in the controller 2 of the image display system 1. In the control process, the vehicle position detector 7 is used to detect the current position of the vehicle at a predetermined interval. In addition, a position of a tail of a traffic congestion is provided by the traffic information center 14 through the communication network to the communication unit 9, and is stored as a hot spot in the hot spot storage 10.

Figure 3:
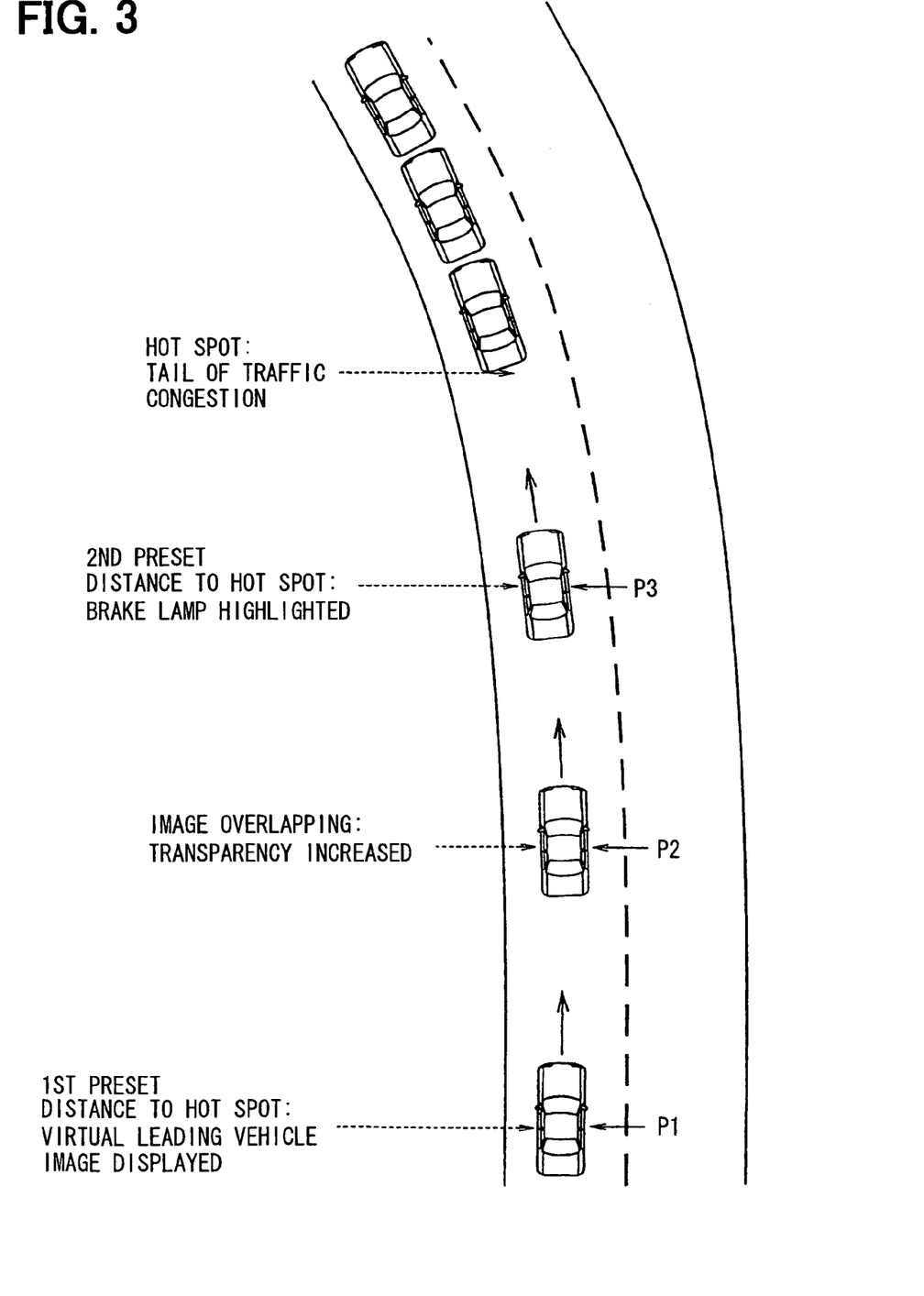
FIG. 3 shows an illustration of a position of a subject vehicle relative to a real leading vehicle.

In step S1, the process in the controller 2 determines whether a distance from the current vehicle position to the hot spot stored in the hot spot storage 10 is smaller than a first preset value by detecting the current position of the subject vehicle and the hot spot. The process proceeds to step S2 when the distance is smaller than the first preset value (step S1:YES) (refer to a point P1 in FIG. 3). The process repeats step S1 when the distance is not smaller than the first value (step S1:NO).

Figure 4A:
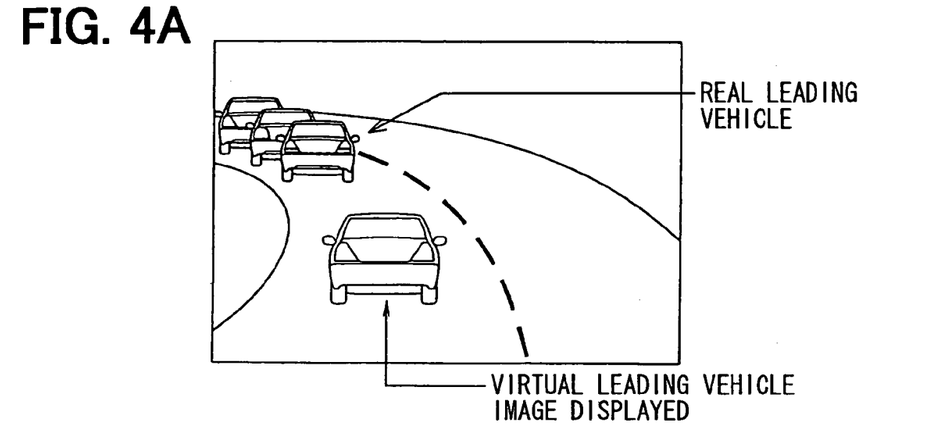
FIGS. 4A to 4C show illustration of a virtual leading vehicle in various representation forms.

In step S2, the process retrieves a virtual vehicle image from the virtual vehicle image storage 8, and transparently displays the image on the windshield in front of the driver as illustrated in FIG. 4A.

In step S3, the process determines whether a distance from the current vehicle position to the hot spot stored in the hot spot storage 10 is smaller than a second preset value that is smaller than the first value by detecting the current position of the subject vehicle and the hot spot. The process proceeds to step S4 when the distance is smaller than the second preset value (step S3:NO) (refer to a point P2 in FIG. 3). The process proceeds to step S5 when the distance is not smaller than the second value (step S3:YES).

In step S4, the process determines whether a look area of the driver detected by the look area detector 6 overlaps the virtual leading vehicle image displayed on the windshield. The process proceeds to step S6 when the look area overlaps the virtual leading vehicle image (step S4:YES). The process returns to step S3 when the look area does not overlap the vehicle image (step S4:NO).

Figure 4B:
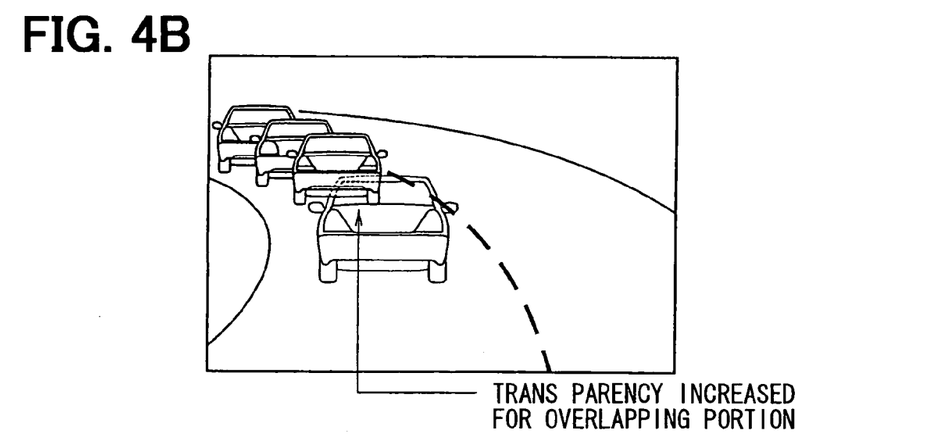

In step S5, the process highlights a brake lamp of the virtual leading vehicle image for warning as shown in the illustration in FIG. 4B. The process proceeds to step S7 after highlighting the brake lamp in the image.

In step S6, the process increases a degree of transparency of the virtual leading vehicle image on the windshield. The increase of the degree of the transparency is provided for a portion of the vehicle image that overlaps the look area of the driver on the windshield. The degree of the transparency for the rest of the virtual leading vehicle image stays intact. As a result, an overlapping portion of the virtual leading vehicle image over the look area of the driver is more transparent than the rest of the vehicle image. In the illustration in FIG. 4B, the highly transparent portion of the virtual leading vehicle image relative to the rest of the vehicle image is indicated by a broken line.

In step S7, the process determines whether the vehicle is reducing its speed. The process proceeds to step S8 when the vehicle is not reducing its speed (step S7:YES). The process proceeds to step S9 when the vehicle is reducing its speed (step S7:NO).

In step S8, the process determines again whether the look area of the driver detected by the look area detector 6 overlaps the virtual leading vehicle image displayed on the windshield. The process proceeds to step S1 when the look area overlaps the virtual leading vehicle image (step S8:YES). At this point, the subject vehicle is assumed to be at a point P3 in FIG. 3. The process returns to step S7 when the look area does not overlap the vehicle image (step S8:NO).

In step S9, the process outputs a control instruction to the travel control unit 13 for providing a brake control (to reduce vehicle speed). The process concludes itself after reducing the vehicle speed.

In step S10, the process increases a degree of transparency of the virtual leading vehicle image on the windshield. The increase of the degree of the transparency is provided for a portion of the vehicle image that overlaps the look area of the driver on the windshield. The degree of the transparency for the rest of the virtual leading vehicle image stays intact. As a result, an overlapping portion of the virtual leading vehicle image over the look area of the driver is more transparent than the rest of the vehicle image. In the illustration in FIG. 4C, the highly transparent portion of the virtual leading vehicle image relative to the rest of the vehicle image is indicated by the broken line.

Figure 4C:
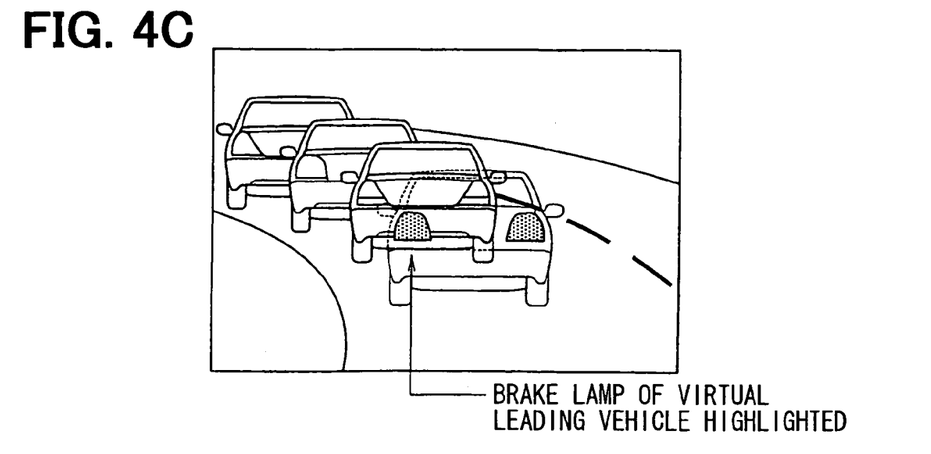
Figure 5:
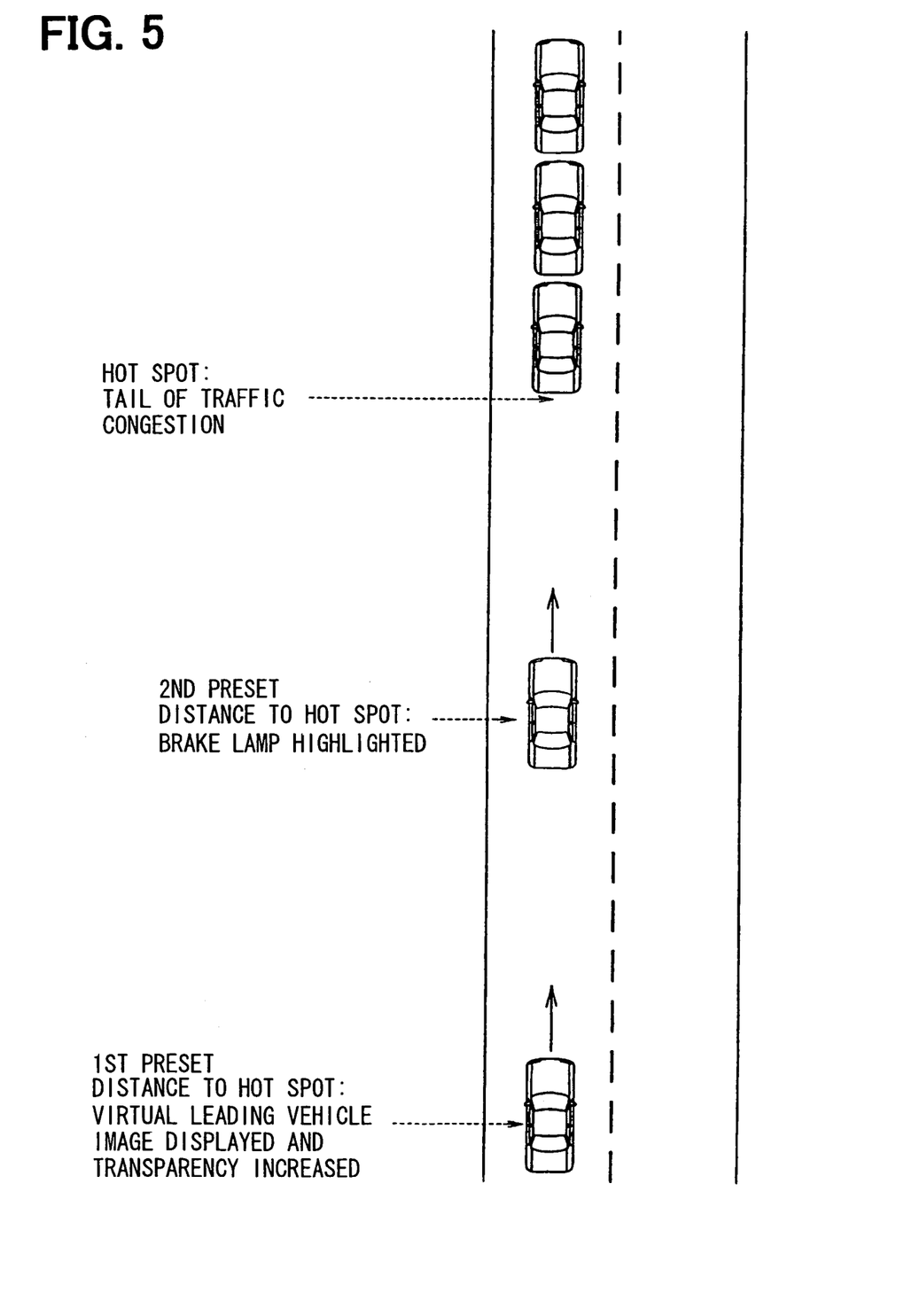
FIG. 5 shows another illustration of the position of the subject vehicle relative to the real leading vehicle.

The highly transparent portion of the virtual leading vehicle image is variably changed depending on a situation. That is, when the subject vehicle is traveling on a curved road, the virtual leading vehicle image starts overlapping on the real vehicle, i.e., the look area of the driver, after the image is displayed on the windshield as illustrated in FIGS. 4A to 4C. On the other hand, when the subject vehicle is traveling on a straight road, transparency control (increase of the transparency) of the virtual leading vehicle image starts at the beginning of display because of the positional relationship between the real leading vehicle and the subject vehicle (refer to the illustration in FIG. 5). That is, the virtual leading vehicle image overlaps the look area of the driver when the image display system 1 starts the display of the virtual leading vehicle image as shown in the illustrations in FIGS. 6A, 6B. In addition, the transparency of the virtual leading vehicle image is entirely increased when the look area of the driver totally overlaps the virtual leading vehicle image.

The representation of the virtual leading vehicle image is variably changed by the controller 2 depending on a relationship between the subject vehicle and the real leading vehicle. That is, a size of the vehicle image, a shape of the vehicle, a color of the vehicle may be variably changed according to the distance between the real leading vehicle and the subject vehicle. The representation may also be changed according to the user input from the operation unit.

The image display system 1 displays the virtual leading vehicle image on the windshield in front of the driver, and increases the transparency of the virtual leading vehicle image for the portion that overlaps the real leading vehicle captured in the look area of the driver. In this manner, the image display system 1 appropriately assists the driver of the subject vehicle even when the virtual leading vehicle image overlaps the real leading vehicle because the increased transparency of the virtual leading vehicle image facilitates recognition of the real leading vehicle by the driver. As a result, the driver of the subject vehicle can get an appropriate driving assistance by the image display system 1. In addition, the transparency of the virtual leading vehicle image is not changed for the portion that does not overlap the look area of the driver for minimizing uncomfortable feeling caused by the change in the transparency.

Further, the virtual leading vehicle image is set to be displayed at the first preset distance when the subject vehicle approaches to the real leading vehicle, and is set to have a highlighted portion in the image when the distance from the real vehicle decreases to be the second preset distance. In this manner, the driver of the subject vehicle is appropriately supported and warned when the subject vehicle approaches, for example, a tail of traffic congestion.

Although the present disclosure has been fully described in connection with the preferred embodiments thereof with reference to the accompanying drawings, it is to be noted that various changes and modifications will become apparent to those skilled in the art.

For example, the degree of the transparency may be increased not only for the overlapping portion but for the surrounding area of the overlapping portion. In this manner, the driver of the subject vehicle can have an increased visibility of the surrounding area of the overlapping portion of the virtual leading vehicle image.

Further, the virtual leading vehicle image may be displayed on a condition that is different from the first preset distance from the real leading vehicle as described above. For example, a foggy condition around the subject vehicle may be detected and used as a condition for displaying the virtual leading vehicle image.

Furthermore, the hot spot stored in the hot spot storage 10 may be different from the tail of the traffic congestion. For example, a construction area, a location of traffic accident or the like may be stored as the hot spot.

Such changes and modifications are to be understood as being within the scope of the present invention as defined by the appended claims.

What is claimed is:

1. An image display system for use of a driver in a subject vehicle comprising:
   a look area detector for detecting a look area of the driver who watches a real leading vehicle through a transparent glass in front of the driver;
   a control unit for controlling a display of a transparent image on the transparent glass in front of the driver for representing a virtual leading vehicle;
   a position detector for detecting a current position of the subject vehicle; and
   a hot spot storage unit for storing information on a hot spot which the driver of the subject vehicle pays attention to; wherein
   when the look area detected by the look area detector overlaps at least a portion of the transparent image of the virtual leading vehicle displayed on the transparent glass, the control unit increases a degree of transparency of at least an overlapping portion of the transparent image of the virtual leading vehicle relative to a non-overlapping portion of the transparent image of the virtual leading vehicle; and
   the control unit begins control of the display of the transparent image of the virtual leading vehicle when a distance between the current position of the subject vehicle detected by the position detector and the hot spot stored in the hot spot storage unit becomes smaller than a first preset value; wherein
   an intensity of the real leading vehicle is not varied.

2. The image display system as in claim 1,
   wherein the control unit controls the display of the transparent image of the virtual leading vehicle accompanied by a warning message when the distance between the current position of the subject vehicle detected by the position detector and the hot spot stored in the hot spot storage unit becomes smaller than a second preset value that is smaller than the first preset value.

3. The image display system as in claim 2,
   wherein the control unit provides speed reduction control for the subject vehicle to reduce a travel speed of the subject vehicle when the current position of the subject vehicle from the hot spot becomes smaller than the second preset distance without speed reduction operation by the driver.

4. The image display system as in claim 1 further comprising:
   a distance measurement unit for measuring a distance from the subject vehicle to the real leading vehicle,
   wherein the control unit controls a size of the transparent image of the virtual leading vehicle according to the distance from the subject vehicle to the real leading vehicle measured by the distance measurement unit.

5. The image display system as in claim 1 further comprising:

an operation unit for inputting a user operation, wherein the control unit changes representation of the transparent image of the virtual leading vehicle according to the user operation inputted by the operation unit.

6. An image display system for use of a driver in a subject vehicle comprising:

a look area detector for detecting a look area of the driver who watches a real leading vehicle through a transparent glass in front of the driver; and a control unit for controlling a display of a transparent image on the transparent glass in front of the driver for representing a virtual leading vehicle, wherein, when the look area detected by the look area detector overlaps a portion of the transparent image of the virtual leading vehicle displayed on the transparent glass, the control unit increases a degree of transparency of only an overlapping portion of the transparent image of the virtual leading vehicle relative to a non-overlapping portion of the transparent image of the virtual leading vehicle; and wherein an intensity of the real leading vehicle is not varied.

7. The image display system as in claim 6 further comprising:

a position detector for detecting a current position of the subject vehicle; and a hot spot storage unit for storing information on a hot spot which the driver of the subject vehicle pays attention to, wherein the control unit begins control of the display of the transparent image of the virtual leading vehicle when a distance between the current position of the subject vehicle detected by the position detector and a hot spot stored in the hot spot storage unit becomes smaller than a first preset value.

8. The image display system as in claim 7, wherein the control unit controls display of the transparent image of the virtual leading vehicle accompanied by a warning message when the distance between the current position of the subject vehicle detected by the position detector and the hot spot stored in the hot spot storage unit becomes smaller than a second preset value that is smaller than the first preset value.

9. The image display system as in claim 8, wherein the control unit provides speed reduction control for the subject vehicle to reduce a travel speed of the subject vehicle when the current position of the subject vehicle from the hot spot becomes smaller than the second preset distance without speed reduction operation by the driver.

10. The image display system as in claim 6 further comprising:

a distance measurement unit for measuring a distance from the subject vehicle to the real leading vehicle, wherein the control unit controls a size of the transparent image of the virtual leading vehicle according to the distance from the subject vehicle to the real leading vehicle measured by the distance measurement unit.

11. The image display system as in claim 6 further comprising:

an operation unit for inputting a user operation, wherein the control unit changes representation of the transparent image of the virtual leading vehicle according to the user operation inputted by the operation unit.

12. The image display system as in claim 6 further comprising means for determining the portion of the transparent image that overlaps the look area.

13. The image display system as in claim 6 wherein the overlapping portion of the transparent image is smaller than the transparent image.

* * * * *

UNITED STATES PATENT AND TRADEMARK OFFICE
CERTIFICATE OF CORRECTION

PATENT NO. : 7,627,419 B2  Page 1 of 1
APPLICATION NO. : 11/510943
DATED : December 1, 2009
INVENTOR(S) : Ichiro Yoshida It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 489 days.

Signed and Sealed this

Second Day of November, 2010

David J. Kappos
*Director of the United States Patent and Trademark Office*